United States Patent
Nosaka et al.

(10) Patent No.: US 10,150,147 B2
(45) Date of Patent: Dec. 11, 2018

(54) PIERCING PLUG (71) Applicant: NIPPON STEEL & SUMITOMO METAL CORPORATION, Chiyoda-ku, Tokyo (JP)

(72) Inventors: Atsushi Nosaka, Tokyo (JP); Yasuyoshi Hidaka, Tokyo (JP); Yasuto Higashida, Tokyo (JP); Ryuutarou Ogata, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 396 days.

(21) Appl. No.: 14/409,150

(22) PCT Filed: Jul. 16, 2013

(86) PCT No.: PCT/JP2013/069241
§ 371 (c)(1),
(2) Date: Dec. 18, 2014

(87) PCT Pub. No.: WO2014/013963
PCT Pub. Date: Jan. 23, 2014

(65) Prior Publication Data
US 2015/0321233 A1    Nov. 12, 2015

(30) Foreign Application Priority Data

Jul. 20, 2012  (JP) ................................. 2012-161045
Aug. 10, 2012  (JP) ................................. 2012-177946

(51) Int. Cl.
*B21B 25/00*       (2006.01)
*C23C 4/00*        (2016.01)
(Continued)

(52) U.S. Cl.
CPC .............. *B21B 25/00* (2013.01); *B21B 19/04* (2013.01); *B32B 15/013* (2013.01);
(Continued)

(58) Field of Classification Search
CPC ........... B21B 25/00; B21B 19/04; C23C 4/00; C23C 4/02; C23C 4/04; C23C 4/073
See application file for complete search history.

(56) References Cited

U.S. PATENT DOCUMENTS 3,338,733 A * 8/1967 Rowady .................... C23C 4/08
                                                 148/526
4,393,677 A   7/1983 Tamura et al.
(Continued)

FOREIGN PATENT DOCUMENTS

CN    1230138 A    9/1999
CN    101603154 A  12/2009
(Continued)

OTHER PUBLICATIONS

International Search Report dated Aug. 20, 2013 issued in corresponding PCT Application No. PCT/JP2013/069241 [with English Translation].

(Continued)

Primary Examiner — Teresa M Ekiert
(74) Attorney, Agent, or Firm — Birch, Stewart, Kolasch & Birch, LLP

(57) ABSTRACT

A piercing plug of the present invention includes: a plug body; a Ni—Cr layer formed on a surface of the plug body; and a sprayed coating formed on a surface of the Ni—Cr layer. The plug body contains, by mass %, 20 to 30% of Cr, 30 to 55% of Ni, 0.005 to 0.5% of C, 0.1 to 1.0% of Si, 0.2 to 1.5% of Mn, and at least one of Mo and W which satisfy a following conditional expression (A), and remainder including Fe and impurities.

$1.5\% \leq Mo+0.5W \leq 8.5\%$  (A)

9 Claims, 3 Drawing Sheets

(51) Int. Cl.
*C23C 4/08* (2016.01)
*C23C 30/00* (2006.01)
*C23C 28/02* (2006.01)
*C22C 30/00* (2006.01)
*C22C 38/00* (2006.01)
*B21B 19/04* (2006.01)
*B32B 15/01* (2006.01)
*C22C 19/05* (2006.01)
*C22C 38/02* (2006.01)
*C22C 38/04* (2006.01)
*C22C 38/06* (2006.01)
*C22C 38/44* (2006.01)
*C21D 9/00* (2006.01)
*C23C 4/02* (2006.01)
*C23C 4/18* (2006.01)
*C23C 28/00* (2006.01)
*C23C 4/067* (2016.01)
*C23C 4/131* (2016.01)

(52) U.S. Cl.
CPC .......... *B32B 15/015* (2013.01); *C21D 9/0068* (2013.01); *C22C 19/05* (2013.01); *C22C 19/055* (2013.01); *C22C 19/058* (2013.01); *C22C 30/00* (2013.01); *C22C 38/00* (2013.01); *C22C 38/02* (2013.01); *C22C 38/04* (2013.01); *C22C 38/06* (2013.01); *C22C 38/44* (2013.01); *C23C 4/02* (2013.01); *C23C 4/067* (2016.01); *C23C 4/08* (2013.01); *C23C 4/131* (2016.01); *C23C 4/18* (2013.01); *C23C 28/021* (2013.01); *C23C 28/321* (2013.01); *C23C 28/324* (2013.01); *C23C 30/005* (2013.01); *C21D 2251/00* (2013.01)

(56) References Cited

U.S. PATENT DOCUMENTS

| | | | |
|---|---|---|---|
| 6,202,463 | B1 | 3/2001 | Yorifuji et al. |
| 2007/0020137 | A1 | 1/2007 | Cokain et al. |

FOREIGN PATENT DOCUMENTS

| | | |
|---|---|---|
| CN | 102284777 | 12/2011 |
| EP | 2198984 | 6/2010 |
| EP | 2404680 | 1/2012 |
| GB | 346357 A | 4/1931 |
| JP | 59-013924 | 7/1981 |
| JP | 64-007147 | 2/1985 |
| JP | 61-286077 | 12/1986 |
| JP | 63-192504 | 8/1988 |
| JP | 01-180711 A | 7/1989 |
| JP | 04-008498 | 1/1992 |
| JP | 04-074848 | 3/1992 |
| JP | 04-270003 | 9/1992 |
| JP | 07-016619 | 1/1995 |
| JP | 10-180315 | 7/1998 |
| JP | 10-306383 A | 11/1998 |
| JP | 2002-113507 A | 4/2002 |
| RU | 2446024 | 3/2012 |
| SU | 818684 | 4/1981 |
| SU | 1340843 | 9/1987 |
| UA | 97027 | 12/2011 |
| WO | WO 2009/057471 | 5/2009 |

OTHER PUBLICATIONS

Office Action from Chinese Patent Application No. 201380034132. X, dated Jul. 2, 2015 (translation of part of search report).
Notice of Allowance dated Feb. 18, 2016 issued in related Russian Application No. 2014153127 [with English Translation].
Extended European Search Report dated Apr. 26, 2016 issued in corresponding European Application No. 13819318.0.
Database WPI Week 201215 Thomson Scientific, AN 2012-A52828, Jun. 17, 2010, London GB (abstract).

\* cited by examiner

PIERCING PLUG

TECHNICAL FIELD

This application is a national stage application of International Application No. PCT/JP2013/069241, filed Jul. 16, 2013, which claims priority to Japanese Patent Application No. 2012-177946, filed on Aug. 10, 2012 and Japanese Patent Application No. 2012-161045, filed on Jul. 20, 2012, each of which is incorporated by reference in its entirety.

The present invention relates to a plug, and more particularly, to a plug used in a piercing machine that pierces and rolls a billet (hereinafter, referred to as a piercing plug).

BACKGROUND ART

A piercing machine is used to manufacture a seamless steel pipe according to the Mannesmann process. The piercing machine includes a pair of inclined rolls and a piercing plug. The piercing plug is disposed on a pass line between the pair of inclined rolls. The piercing machine presses the plug into the billet while rotating the billet in the circumferential direction using the inclined rolls to pierce and roll the billet, thereby manufacturing a hollow tube stock.

The piercing machine pierces and rolls the billet heated at a high temperature. Therefore, the piercing plug pressed into the billet is exposed to the high temperature and receives a high pressure. Therefore, the piercing plug is likely to be subjected to erosion and seizure.

Generally, oxidized scale is formed on the surface of a base material of the piercing plug. The oxidized scale blocks heat from the billet and suppresses the generation of erosion. Furthermore, the oxidized scale suppresses the generation of seizure.

However, the oxidized scale wears when the billet is pierced and rolled. When the oxidized scale is removed, the temperature of the base material of the piercing plug is increased, and thus the piercing plug is eroded.

In order to increase the usage count of the piercing plug, not only forming oxidized scale on the surface of the base material of the piercing plug but also adjusting the component composition of the base material is suggested (for example, refer to Patent Documents 1 to 3 as follows).

PRIOR ART DOCUMENT

Patent Document

[Patent Document 1] Japanese Unexamined Patent Application, First Publication No. H4-74848
[Patent Document 2] Japanese Unexamined Patent Application, First Publication No. H4-270003
[Patent Document 3] Japanese Examined Patent Application, Second Publication No. S64-7147

DISCLOSURE OF THE INVENTION

Problem that the Invention is to Solve

The base material of the piercing plug disclosed in any of Patent Documents 1 to 3 is a Fe-based alloy, and oxidized scale is formed on the surface of the base material. However, when a degree of deformation or erosion of the base material due to contact with the billet or the like during piercing and rolling is high, the piercing plug cannot be reused to manufacture the hollow tube stock of the same size. That is, the usage count of the piercing plug is reduced.

On the other hand, in recent years, instead of oxidized scale, a technique of forming a sprayed coating on the surface of the base material of the piercing plug by arc-spraying a steel wire rod is established (for example, refer to PCT International Publication No. WO2009/057471). As described above, in a case of forming oxidized scale on the surface of the base material of the piercing plug, the base material needs to be formed from the Fe-based alloy that is easily oxidized. However, due to the establishment of the spraying techniques in recent years, there is no need to form oxidized scale on the surface of the base material of the piercing plug, and thus the degree of design freedom of the composition of the base material is significantly enhanced.

Here, the inventors thoroughly researched whether or not a Ni—Cr-based alloy having excellent high-temperature strength, deformation resistance, and thermal shock resistance compared to the Fe-based alloy can be used as the base material of the piercing plug. As a result, although the deformation of the base material due to the piercing and rolling was significantly suppressed, a sprayed coating formed on the surface of the base material was likely to be peeled off, and thus it was determined that the life span of the piercing plug was reduced due to the progress in erosion or seizure.

The present invention is made taking the foregoing circumstances into consideration, and an object thereof is to provide a piercing plug which has excellent deformation resistance of a base material (plug body) and excellent adhesion of a sprayed coating and has a long life span.

Means for Solving the Problems

In order to accomplish the object to solve the problems, the present invention employs the following means. That is, (1) A piercing plug according to an aspect of the present invention includes: a plug body; a Ni—Cr layer formed on a surface of the plug body; and a sprayed coating formed on a surface of the Ni—Cr layer. The plug body contains, by mass %, 20 to 30% of Cr, 30 to 55% of Ni, 0.005 to 0.5% of C, 0.1 to 1.0% of Si, 0.2 to 1.5% of Mn, and at least one of Mo and W which satisfy the following conditional expression (A), and remainder including Fe and impurities.

$$1.5\% \leq Mo + 0.5W \leq 8.5\% \quad (A)$$

(2) In the piercing plug described in (1), a heat treatment may be performed at 850 to 1150° C. after the Ni—Cr layer and the sprayed coating are formed on the plug body.
(3) In the piercing plug described in (1) or (2), the sprayed coating may contain iron and iron oxide.
(4) In the piercing plug described in any one of (1) to (3), the sprayed coating may be formed by arc-spraying a steel wire rod.
(5) In the piercing plug described in any one of (1) to (4), a thickness of the Ni—Cr layer may be 50 to 100 μm.

Advantage of the Invention

According to the aspect, it is possible to provide the piercing plug which has excellent deformation resistance of the base material (the plug body) and excellent adhesion of the sprayed coating and has a long life span.

BEST MODE FOR CARRYING OUT THE INVENTION

Hereinafter, a piercing plug according to an embodiment of the present invention will be described with reference to the drawings. Like elements are denoted by like reference numerals in the drawings, and description thereof will not be repeated.

Figure 1:
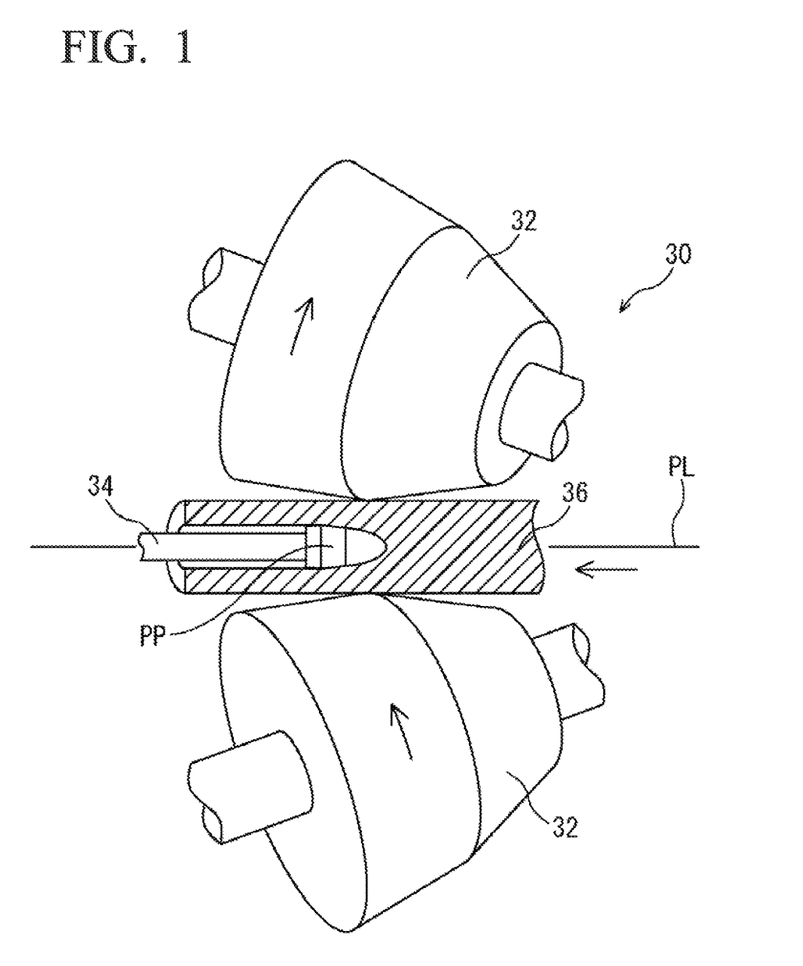
FIG. 1 is a schematic diagram illustrating the configuration of a general piercing machine.

FIG. 1 is a schematic diagram illustrating the configuration of a general piercing machine 30. In the piercing machine 30, a piercing plug PP is mounted to the tip end of a core metal 34 and is disposed on a pass line PL between a pair of inclined rolls 32 and 32. During piercing and rolling, the piercing plug PP is pressed into a billet 36. Therefore, the piercing plug PP is exposed to a high temperature and receives a high pressure. As a result, in the piercing plug PP, there may be cases where a plug body, which is a base material, is deformed or eroded due to the contact with the billet and the like.

As described above, the plug body of the piercing plug PP according to the related art is typically made from a Fe-based alloy. In this case, oxidized scale is easily formed on the surface of the plug body. Oxidized scale increases seizure resistance and blocks heat from the billet 36, thereby suppressing erosion to some extent. However, in the case where the plug body is made from the Fe-based alloy, there may be cases where the plug body is significantly deformed or eroded and thus the shape thereof is changed due to the contact with the billet 36. Particularly, the tip end portion of the piercing plug PP strongly comes into contact with the billet 36, and thus the change in the shape due to erosion or deformation caused by an external force during contact is likely to increase.

Here, the piercing plug of this embodiment includes a plug body made from a Ni—Cr-based alloy having a chemical composition, described later, other than the Fe-based alloy in order to suppress the deformation amount of the plug body which is the base material. The Ni—Cr-based alloy has high high-temperature strength, high deformation resistance, and high thermal shock resistance. Therefore, even when the piercing plug of this embodiment comes into contact with the billet 36, the piercing plug is less likely to be deformed and eroded.

However, the Ni—Cr-based alloy has a high Cr content, and thus it is difficult to form oxidized scale on the surface. If a hot working tool made from the Ni—Cr-based alloy is used for other purposes (for example, a guide shoe) than the piercing plug, the generation of seizure can be suppressed by supplying a lubricant onto the surface even though it is difficult to form the oxidized scale.

However, the piercing plug is difficult to be supplied with a lubricant on the surface of the piercing plug during piercing and rolling. This is because the piercing plug is pressed into the billet as illustrated in FIG. 1. Therefore, when the plug body made from the Ni—Cr-based alloy is used for the piercing plug as it is, there is a possibility of seizure.

Here, the piercing plug of this embodiment includes a Ni—Cr layer formed on the surface of the plug body and a sprayed coating formed on the surface of the Ni—Cr layer. Since the sprayed coating has seizure resistance, even the piercing plug made from the Ni—Cr-based alloy can suppress the generation of seizure.

In this case, the Ni—Cr layer functions as an adhesive layer between the plug body and the sprayed coating and increases the adhesion of the sprayed coating to the plug body. Therefore, the shear strength of the sprayed coating against the plug body is increased, and thus peeling of the sprayed coating is suppressed. As a result, the piercing plug which has excellent deformation resistance of the base material (the plug body) and excellent adhesion of the sprayed coating and has a long life span is obtained.

The piercing plug of this embodiment based on the above technical idea is as described below.

The piercing plug of this embodiment includes the plug body, the Ni—Cr layer, and the sprayed coating. The Ni—Cr layer is formed on the surface of the plug body. The sprayed coating is formed on the surface of the Ni—Cr layer. The plug body contains, by mass %, 20 to 30% of Cr, 30 to 55% of Ni, 0.005 to 0.5% of C, 0.1 to 1.0% of Si, 0.2 to 1.5% of Mn, and at least one of Mo and W that satisfy the following conditional expression (A), and the remainder thereof is Fe and impurities.

$$1.5\% \leq Mo + 0.5W \leq 8.5\% \tag{A}$$

The plug body having the chemical composition has high high-temperature strength, high deformation resistance, and high thermal shock resistance, and thus erosion or deformation is suppressed. Moreover, since the sprayed coating has seizure resistance, seizure is less likely to be generated. In addition, since the sprayed coating blocks heat from the billet, the plug body is less likely to be deformed due to the heat from the billet. Furthermore, the sprayed coating has excellent wear resistance. Therefore, the usage count of the piercing plug according to this embodiment of the present invention as a piercing plug for manufacturing the hollow tube stock of the same size is increased.

In addition, even when the sprayed coating is peeled off from the plug body by piercing the billet, by forming the sprayed coating again, a plug body capable of manufacturing the hollow tube stock of the same size can be obtained. This is because the plug body is less likely to be deformed and eroded as described above. Therefore, the usage count of the plug body is enhanced.

Preferably, the sprayed coating contains iron and iron oxide. In this case, the wear resistance of the sprayed coating is enhanced.

The sprayed coating that contains iron and iron oxide is preferably formed by arc-spraying a steel wire rod. In this case, the manufacturing cost of the sprayed coating can be suppressed.

In addition, the Ni—Cr layer functions as the adhesive layer between the plug body and the sprayed coating and increases the adhesion of the sprayed coating to the plug body. Therefore, the shear strength of the sprayed coating against the plug body is increased, and thus peeling of the sprayed coating is suppressed.

Preferably, the piercing plug of this embodiment is subjected to a heat treatment after the Ni—Cr layer and the sprayed coating is formed on the plug body.

In this case, Ni in the Ni—Cr layer is diffused into the sprayed coating. Accordingly, the adhesion of the sprayed coating is further increased and is less likely to be peeled off.

Hereinafter, details of the piercing plug according to this embodiment will be described.

[Entire Configuration of Piercing Plug]

Figure 2:
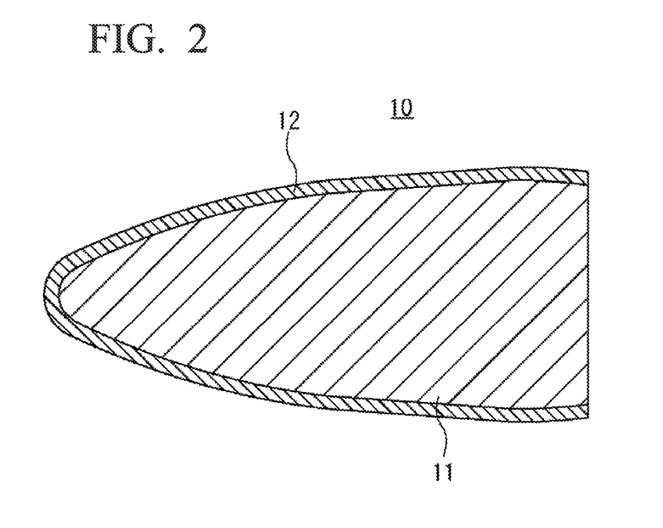
FIG. 2 is a longitudinal sectional view of a piercing plug according to an embodiment of the present invention.

FIG. 2 is a longitudinal sectional view of a piercing plug 10 of this embodiment (a cross-sectional view from a surface that includes the center axis of the piercing plug 10). Referring to FIG. 2, the piercing plug 10 is used in the piercing machine (piercer). The piercing plug 10 includes a plug body 11 and a protective coating 12.

[Plug Body]

The transverse shape of the plug body 11 is a circular shape, and the outside diameter thereof is increased toward the rear end. As with other well-known piercing plugs, the plug body 11 includes a rolling portion and a reeling portion. The plug body 11 is made from the Ni—Cr-based alloy as described above. More specifically, the plug body 11 contains, by mass %, 20 to 30% of Cr, 30 to 55% of Ni, 0.005 to 0.5% of C, 0.1 to 1.0% of Si, 0.2 to 1.5% of Mn, and at least one of Mo and W that satisfy the following conditional expression (A), and the remainder thereof includes Fe and impurities. Any of the elements Cr, Ni, Mo, and W increases high-temperature strength. Hereinafter, each of the elements will be described.

$$1.5\% \leq Mo+0.5W \leq 8.5\% \quad (A)$$

Cr increases the high-temperature strength of an alloy. When the Cr content is too low, the above effect is not effectively obtained. On the other hand, when the Cr content is too high, there may be cases where the plug body 11 becomes brittle. Therefore, the Cr content is 20 to 30%. The preferable low limit of the Cr content is 25%. The preferable upper limit of the Cr content is 30%.

Ni increases the deformation resistance of the alloy and increases the strength of the alloy. Furthermore, Ni increases the toughness and thermal shock resistance of the alloy. When the Ni content is too low, the above effect is not effectively obtained. On the other hand, when the Ni content is too high, the effect is saturated and thus manufacturing cost is increased. Therefore, the Ni content is 30 to 55%. The preferable low limit of the Ni content is 35%. The preferable upper limit of the Ni content is 50%.

Any of Mo and W increases the high-temperature strength of the alloy. When the content of at least one of Mo and W does not satisfy the conditional expression (A), the above effect is not effectively obtained. The preferable upper limit of the Mo content is 7.0%, and the preferable upper limit of the W content is 3.0%.

C increases the high-temperature strength of the alloy. When the C content is less than 0.005%, the high-temperature strength is not obtained enough. On the other hand, when C content is more than 0.5%, a quenching crack is easy to occur on the surface of the plug body 11. Therefore, the C content is 0.005 to 0.5%. The preferable range of the C content is 0.01 to 0.3%.

Si has deoxidation effect, and is effective to raise the AC1 transition temperature and increase the density of the oxidized scale formed on the surface of the plug body 11. In addition, since Si accelerates generation of fayalite ($Fe_2SiO_4$), high-temperature deformability of the oxidized scale is increased, and thus the adhesion is enhanced effectively. However, when the Si content is less than 0.1%, the above effect is not obtained. On the other hand, when the Si content is more than 1.0%, the fayalite is generated in large quantities, and not only the melting temperature of the oxidized scale falls, but also the toughness of the base material (plug body 11) decreases. Therefore, the Si content is 0.1 to 1.0%. The preferable range of the Si content is 0.1 to 0.6%. The more preferable range of the Si content is 0.1 to 0.5%.

Mn stabilizes the austenite at the high temperature. That is, Mn suppresses the generation of the delta ferrite and suppresses the decreasing of the toughness. This effect is obtained when the Mn content is greater than or equal to 0.2%. On the other hand, when the Mn content is more than 1.5%, the hardness becomes too high and thus the quenching crack becomes easy to occur after piercing. Therefore, the Mn content is 0.2 to 1.5%.

The plug body 11 includes the elements described above, and includes Fe and impurities as the remainder. As the impurities, elements included in raw materials such as ores or scraps, or mixed in manufacturing process are enumerated. As the impurities, for example, P and S are enumerated. It is better that the P content and the S content are smaller. On the other hand, when each of the P content and the S content is more than 0.01%, the toughness of the plug body 11 decreases. Therefore, the upper limits of the P content and the S content are 0.01%. The chemical composition of the plug body 11 may further contain other alloy elements (for example, Al, Ti, B, Ca, REM, Nb, or the like) as optional element. In summary, the chemical composition of the plug body 11 may contain 20 to 30% of Cr, 30 to 55% of Ni, 0.005 to 0.5% of C, 0.1 to 1.0% of Si, 0.2 to 1.5% of Mn, and at least one of Mo and W that satisfy the conditional expression (A).

The plug body 11 may include soluble aluminium (Sol-Al) as the optional element. The soluble aluminium is an element having the deoxidation effect. It is necessary that the content of the soluble aluminium is greater than or equal to 0.005%. On the other hand, when the content of the soluble aluminium is more than 0.05%, the toughness of the plug body 11 decreases. Therefore, the content of the soluble aluminium is 0.005 to 0.05%.

In addition, the plug body 11 may include at least one of Ti, Nb, V, Zr, and B as the optional element. These elements have grain refining effect and are effective elements to enhance the toughness of the plug body 11. It is preferable that the total content of these elements is greater than or equal to 0.05%. On the other hand, when the total content of these elements is more than 0.5%, an embrittlement layer appears and the strength of the plug body 11 decreases. Therefore, it is preferable that the total content of these elements is 0.05 to 0.5%.

Figure 3:
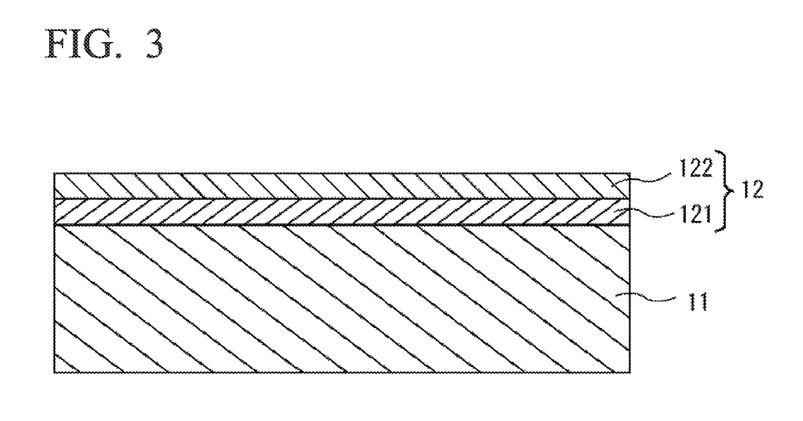
FIG. 3 is an enlarged diagram of the vicinity of the surface of the piercing plug shown in FIG. 2.

FIG. 3 is an enlarged diagram of a part in the vicinity of the surface of the piercing plug 10 in FIG. 2. Referring to FIG. 3, the protective coating 12 includes a Ni—Cr layer 121 and a sprayed coating 122. The protective coating 12 suppresses the seizure and erosion of the piercing plug 10.

[Ni—Cr Layer 121]

The Ni—Cr layer 121 is formed on the surface of the plug body 11. The Ni—Cr layer 121 is made from a Ni—Cr alloy. Preferably, the Ni—Cr alloy contains, by mass %, 20 to 50% of Cr and 50 to 80% of Ni, and includes impurities as the remainder.

The Ni—Cr layer 121 increases the adhesion of the sprayed coating 122 to the plug body 11. Since the Ni—Cr layer 121 is formed between the sprayed coating 122 and the plug body 11, the sprayed coating 122 is less likely to be peeled off from the plug body 11, and thus the shear strength of the sprayed coating 122 is increased.

Moreover, the Ni—Cr layer 121 is less likely to be oxidized. Therefore, the interface between the Ni—Cr layer 121 and the sprayed coating 122 is less likely to be oxidized, and the sprayed coating 122 is less likely to be peeled off.

The preferable thickness of the Ni—Cr layer 121 is 50 to 100 μm. The Ni—Cr layer 121 is formed by, for example, spraying. Examples of spraying include arc spraying, plasma spraying, flame spraying, and high-velocity flame spraying.

Preferably, the Ni—Cr layer 121 is formed on the surface of the plug body 11 after a shot blasting treatment is performed on the surface of the plug body 11. In this case, the adhesion of the Ni—Cr layer 121 to the plug body 11 is further enhanced.

[Sprayed Film 122]

The sprayed coating 122 is formed on the surface of the Ni—Cr layer 121. The chemical composition of the sprayed coating 122 is not particularly limited. Preferably, the sprayed coating 122 is made from iron (Fe) and iron oxide (for example, $Fe_3O_4$, FeO, and the like). In this case, the sprayed coating 122 is formed by, for example, arc-spraying a steel wire rod. The sprayed coating 122 having the above composition can be formed within a short time compared to the formation of oxidized scale by a heat treatment, and furthermore has excellent heat shielding properties and seizure resistance.

The sprayed coating 122 may further include oxides (for example, tungsten oxide and the like) other than iron oxide.

Preferably, the volume ratio of the iron oxide in the sprayed coating 122 made from iron and iron oxide is 55 to 80%. More preferably, the volume ratio of the iron oxide in the sprayed coating 122 on the surface layer side is higher than that on the plug body 11 side. In this case, the ratio of the iron oxide to the sprayed coating 122 is 40% or less at the boundary portion between the sprayed coating 122 and the plug body 11 and is 55 to 80% at the surface layer portion. In order to change the ratio of the iron oxide to the sprayed coating 122, for example, the distance (spraying distance) from a spraying nozzle of the arc spraying apparatus to the plug body 11 may be changed.

The piercing plug 10 according to this embodiment uses the Ni—Cr layer 121 as the underlayer of the sprayed coating 122 as described above. In this case, the shear strength of the sprayed coating 122 against the plug body 11 is higher than that in a case where the sprayed coating 122 is directly formed on the surface of the plug body 11. Therefore, during piercing and rolling, even when the piercing plug 10 collides with or comes into contact with the billet, the sprayed coating 122 is less likely to be peeled off from the plug body 11.

Preferably, the piercing plug 10 is subjected to a heat treatment. The heat treatment is performed by, for example, the following method. After the Ni—Cr layer 121 and the sprayed coating 122 are formed on the plug body 11, the piercing plug 10 is put in a heat treating furnace. The preferable heat treatment temperature is 850 to 1150° C., and the preferable heat treatment time is 30 to 120 minutes. The atmosphere of the heat treating furnace is preferably an inert gas atmosphere. In this case, Ni in the Ni—Cr layer 121 is diffused into the sprayed coating 122. As a result, the shear strength of the sprayed coating 122 is further increased, and the sprayed coating 122 is further less likely to be peeled off.

As described above, according to this embodiment, it is possible to provide the piercing plug 10 which has excellent deformation resistance of the base material (the plug body 11) and excellent adhesion of the sprayed coating 122 and has a long life span.

EXAMPLES

First, a plurality of piercing plugs in which the plug bodies have different chemical compositions were prepared, and the deformation ratio of each piercing plug after piercing and rolling was examined.

[Test Method]

Plug bodies having chemical compositions shown in Table 1 were prepared.

TABLE 1

| | Chemical composition (unit is mass %, remainder includes iron impurities) | | | | | | | | | | | | | Deformation ratio |
|---|---|---|---|---|---|---|---|---|---|---|---|---|---|---|
| | C | Si | Mn | P | S | Cr | Ni | W | Mo | Nb | Sol-Al | Ce + La | Ti | |
| Example 1 | 0.01 | 0.26 | 0.61 | 0.013 | 0.000 | 20.89 | 39.29 | 1.30 | 2.95 | — | 0.03 | — | — | 0.12 |
| Example 2 | 0.01 | 0.32 | 0.57 | 0.014 | 0.002 | 23.87 | 50.05 | 0.90 | 6.40 | — | 0.04 | — | 0.07 | 0.10 |
| Comparative Example 1 | 0.30 | 0.56 | 0.71 | 0.015 | 0.023 | 2.92 | 1.41 | — | — | — | — | — | — | 1.00 |
| Comparative Example 2 | 0.15 | 0.51 | 0.41 | 0.010 | 0.005 | 0.42 | 1.13 | 2.91 | 1.51 | 0.02 | 0.04 | 0.03 | — | 0.57 |

The chemical compositions of the plug bodies of Examples 1 and 2 were in the range of the present invention. On the other hand, the plug bodies of Comparative Examples 1 and 2 were made from the Fe-based alloy, and the chemical compositions thereof had low Ni contents and low Cr contents and were not in the range of the present invention.

A protective coating (a Ni—Cr layer and a sprayed coating) was formed on the surface of each of the plug bodies to manufacture a piercing plug. The sprayed coating was made from iron and iron oxide and was formed by arc-spraying a steel wire rod under the same manufacturing conditions. The content (volume %) of the iron oxide in the sprayed coating in each of the piercing plugs was 20% at the boundary portion between the piercing plug and the plug body and was 70% at the surface layer portion in any of the piercing plugs. The thickness of the sprayed coating was 1200 μm at the tip end and was 400 μm at other parts in any of the piercing plugs.

Using the piercing plugs, billets were pierced and rolled. The billet was a 13 Cr steel and had a diameter of 191 mm and a length of 2200 mm. The temperature of the billet after starting piercing and rolling was about 1200° C. After piercing and rolling the billet, the axial length of the piercing plug was measured. By subtracting the axial length of the piercing plug after the piercing and rolling from the axial length of the piercing plug before the piercing and rolling, the deformation amount of the axial length of the piercing plug was obtained. By dividing the deformation amounts of the other piercing plugs (the piercing plugs according to Examples 1 and 2 and the piercing plug according to Comparative Example 2) by the deformation amount of the piercing plug according to Comparative Example 1, the deformation ratio of the axial length of the piercing plug was obtained.

[Test Results]

The test results are shown together in Table 1. The deformation ratios of the piercing plugs according to Examples 1 and 2 were smaller than those of the piercing plugs according to Comparative Examples 1 and 2. That is, it could be confirmed that the piercing plugs according to Examples 1 and 2 had higher deformation resistance than the piercing plugs according to Comparative Examples 1 and 2, and the usage count thereof as a piercing plug for manufacturing the hollow tube stock of the same size was increased.

Next, as shown in Table 2, a plurality of piercing plugs having various protective coatings and specimens for a shear strength test were manufactured.

TABLE 2

| Test No. | Underlayer | | | Sprayed coating | | Shear strength (kgf/mm$^2$) | Pass ratio |
|---|---|---|---|---|---|---|---|
| | Material | thickness (μm) | Heat treatment | Material | thickness (μm) | | |
| 1 | No | 0 | No | Fe and Fe oxide | 500 | 1.00 | 1.00 |
| 2 | NiCrAlY | 100 | No | Fe and Fe oxide | 400 | 1.38 | 1.33 |
| 3 | 50Ni50Cr | 50 | No | Fe and Fe oxide | 450 | 1.15 | 1.25 |
| 4 | 50Ni50Cr | 50 | Yes | Fe and Fe oxide | 450 | 1.75 | 1.42 |
| 5 | Al | 50 | No | Fe and Fe oxide | 450 | 0.72 | 0.67 |
| 6 | 50Ni50Cr | 100 | No | Fe and Fe oxide | 400 | 1.20 | 1.25 |

[Piercing Plug]

Referring to Table 2, in Test No. 1, a sprayed coating made from iron and iron oxide was directly formed on the surface of a plug body. In Test Nos. 2 to 4 and 6, a Ni—Cr layer was formed on the surface of a plug body as an underlayer, and a sprayed coating having the same composition as Test No. 1 was further formed on the surface of the Ni—Cr layer. The Ni—Cr layer of Test No. 2 was made from a NiCrAlY alloy. The Ni—Cr layers of Test Nos. 3, 4, and 6 contained 50 mass % of Ni and 50 mass % of Cr.

In the piercing plug of Test No. 5, an Al layer was formed on the surface of a plug body as an underlayer, and a sprayed coating having the same composition as Test No. 1 was formed on the surface of the Al layer.

Among the piercing plugs of Test Nos. 1 to 6, for those having the underlayers, the underlayer was formed by arc spraying. The thickness of the underlayer of each test number was as shown in Table 2. The sprayed coating of each piercing plug was formed by arc-spraying a steel wire rod. The conditions of arc spraying for each test number were the same. The thickness of each sprayed coating was as shown in Table 2 and the sum of 500 μm was achieved in all cases by adding up the thickness of the corresponding underlayer.

Regarding Test No. 4, a heat treatment was performed after forming the sprayed coating. Specifically, the piercing plug was put in a heat treating furnace under the Ar atmosphere, and was maintained at 1000° C. for 60 minutes, followed by furnace cooling. Regarding the piercing plugs of the other test numbers than Test No. 4, no heat treatment was performed.

In addition, all the materials of the plug body of the piercing plug of each test number had a chemical composition corresponding to SKD61 of the JIS standards.

[Specimens for Shear Strength Measurement]

The shape of a specimen of each test number described above was 50 mm×20 mm×10 mm. The material of the specimen was the same as the plug body. The same protective coating as that of the piercing plug of the same test number was formed on the surface (hereinafter, referred to as a main surface) with a size of 50 mm×20 mm of each specimen. Specifically, on the main surface of the specimen of Test No. 1, the sprayed coating made from Fe and Fe oxide with a thickness of 500 μm was directly formed as shown in Table 2. On the main surfaces of the specimens of Test Nos. 2 to 4 and 6, the Ni—Cr layer having the chemical composition and the thickness shown in Table 2 and the sprayed coating made from Fe and Fe oxide were formed to achieve a total thickness of 500 μm. On the main surface of the specimen of Test No. 5, the Al layer and the sprayed coating made from Fe and Fe oxide were formed to achieve a total thickness of 500 μm. Regarding the specimen of Test No. 4, a heat treatment was performed under the same conditions as those of the piercing plug of Test No. 4.

[Shear Strength Measurement Test]

Using the specimen of each test number, the shear strength of the protective coating (the Ni—Cr layer and the sprayed coating) was measured by the following method.

Figure 4:
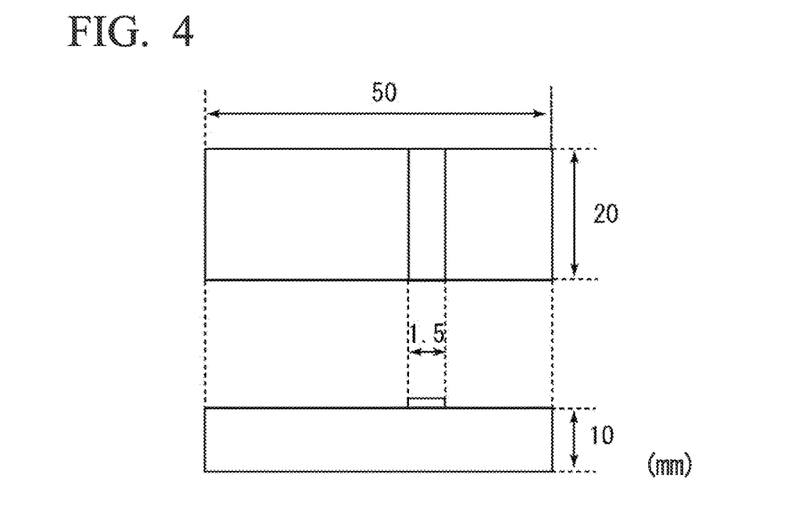
FIG. 4 is a plan view and a side view of a specimen used for a shear strength measurement test.

The protective coating (the sprayed coating in Test No. 1, and the underlayer and the sprayed coating in Test Nos. 2 to 6) on the main surface of each specimen was cut and removed, and a part of the protective coating was remained on the main surface as shown in FIG. 4. The numerical values in FIG. 4 represent dimensions (mm).

Using the specimen in which a part of the protective coating was remained, the shear strength test based on JIS G0601(2002) 5.4 was performed to obtain a shear strength (kgf/mm$^2$).

[Piercing and Rolling Test]

Using the piercing plug of each test number, a plurality of round billets were pierced and rolled to evaluate the adhesion of the coating. Specifically, the plurality of round billets (with an outside diameter of 70 mm and a length of 700 mm) having the chemical composition corresponding to SUS304 specified in the JIS standards were prepared.

The round billet was pierced and rolled using the piercing plug of each test number. Whenever the single round billet was pierced and rolled, the surface of the piercing plug was visually observed to check whether or not peeling of the sprayed coating had occurred. In a case where peeling of the sprayed coating was confirmed after n-th (n is a natural number) piercing and rolling, the number of passes in which the piercing plug could be used for piercing and rolling (hereinafter, simply referred to as the number of passes) was defined as n−1.

The number of passes was obtained for the piercing plug of each test number. In addition, the pass ratio R of each test number was obtained on the basis of the following expression.

$R$=the number of passes of corresponding test number/the number of passes of Test No. 1

[Test Results]

The test results are shown in Table 2.

The shear strengths of Test Nos. 2 to 4 and 6 were higher than those of Test Nos. 1 and 4. Moreover, the pass ratios thereof were higher than 1. It is thought that this is because the Ni—Cr layer was formed as the underlayer and thus the sprayed coating was less likely to be peeled off.

Although the materials of the underlayer and the sprayed coating of Test Nos. 3 and 4 were the same, the materials of Test No. 4 were subjected to the heat treatment. As a result, the shear strength and the pass ratio of Test No. 4 were higher than those of Test No. 3.

On the other hand, the shear strength of Test No. 5 was lower than those of Test Nos. 1 to 4 and 6, and the pass ratio thereof was also low. It is thought that this is because the Al layer as the underlayer degraded the adhesion of the sprayed coating.

While the embodiments of the present invention have been described, the above-described embodiments are only examples for embodying the present invention. Therefore, the present invention is not limited to the above-described embodiments, and the above-described embodiments can be appropriately modified in a range that does not depart from the scope thereof.

DESCRIPTION OF REFERENCE NUMERALS AND SIGNS

10: piercing plug
11: plug body
12: protective coating
121: Ni—Cr layer
122: sprayed coating

The invention claimed is:

1. A piercing plug comprising:
a plug body;
a Ni—Cr layer formed on a surface of the plug body, the Ni—Cr layer coming into contact with the plug body; and
a sprayed coating formed on a surface of the Ni—Cr layer,
wherein the plug body contains, by mass %, 20 to 30% of Cr, 30 to 50% of Ni, 0.005 to 0.5% of C, 0.1 to 1.0% of Si, 0.2 to 1.5% of Mn, and at least one of Mo and W which satisfy conditional expression (A): $1.5\% \leq Mo + 0.5W \leq 8.5\%$, with a remainder including Fe and impurities.

2. The piercing plug according to claim 1,
wherein a heat treatment is performed at 850 to 1150° C. after the Ni—Cr layer and the sprayed coating are formed on the plug body.

3. The piercing plug according to claim 1 or 2,
wherein the sprayed coating contains iron and iron oxide.

4. The piercing plug according to claim 1 or claim 2,
wherein the sprayed coating is formed by arc-spraying a steel wire rod.

5. The piercing plug according to claim 1 or claim 2,
wherein a thickness of the Ni—Cr layer is 50 to 100 μm.

6. The piercing plug according to claim 3,
wherein the sprayed coating is formed by arc-spraying a steel wire rod.

7. The piercing plug according to claim 3,
wherein a thickness of the Ni—Cr layer is 50 to 100 μm.

8. The piercing plug according to claim 4,
wherein a thickness of the Ni—Cr layer is 50 to 100 μm.

9. The piercing plug according to claim 6,
wherein a thickness of the Ni—Cr layer is 50 to 100 μm.

* * * * *